(12) United States Patent
Gammill

(10) Patent No.: US 7,520,531 B2
(45) Date of Patent: Apr. 21, 2009

(54) INFLATOR DEVICE PRESSURE RELIEF

(75) Inventor: Kurt Gammill, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 530 days.

(21) Appl. No.: 11/363,565

(22) Filed: Feb. 28, 2006

(65) Prior Publication Data

US 2007/0200325 A1    Aug. 30, 2007

(51) Int. Cl.
*B60R 21/26* (2006.01)
(52) U.S. Cl. .................. 280/737; 280/741; 280/742; 102/530
(58) Field of Classification Search .......... 280/736, 280/737, 738, 740, 741, 742; 102/530, 531
See application file for complete search history.

(56) References Cited

U.S. PATENT DOCUMENTS

| | | | | | |
|---|---|---|---|---|---|
| 5,054,811 | A | * | 10/1991 | Unterforsthuber et al. | 280/742 |
| 5,060,974 | A | * | 10/1991 | Hamilton et al. | 280/736 |
| 5,406,889 | A | * | 4/1995 | Letendre et al. | 102/201 |
| 5,429,387 | A | * | 7/1995 | Clark et al. | 280/737 |
| 5,496,062 | A | * | 3/1996 | Rink et al. | 280/737 |
| 5,607,181 | A | * | 3/1997 | Richardson et al. | 280/737 |
| 5,642,903 | A | * | 7/1997 | Headley | 280/737 |
| 5,673,933 | A | * | 10/1997 | Miller et al. | 280/736 |
| 5,713,597 | A | * | 2/1998 | Bailey | 280/741 |
| 5,738,372 | A | * | 4/1998 | Lowe et al. | 280/736 |
| 6,244,623 | B1 | | 6/2001 | Moore et al. | |
| 6,814,371 | B2 | | 11/2004 | Welz | |

\* cited by examiner

*Primary Examiner*—Toan C To
(74) *Attorney, Agent, or Firm*—Sally J Brown; Pauley Petersen & Erickson

(57) ABSTRACT

An inflator device for an inflatable cushion restraint system. The inflator device includes a housing at least in part defining a chamber containing a stored gas. The housing includes a first outlet orifice and a second outlet orifice. A first rupturable seal is disposed over the first outlet orifice and a second rupturable seal is disposed over the second outlet orifice. The second outlet orifice is a pressure release orifice for releasing the pressurized gas upon unanticipated elevated temperatures, such as during bonfire conditions. A plug is disposed in the second outlet orifice. The plug includes a low melting temperature material adjacent the second rupturable seal. The low melting temperature material melts at or below an auto-ignition temperature of the inflator device to allow the second rupturable seal to rupture to vent the pressurized stored gas.

20 Claims, 1 Drawing Sheet

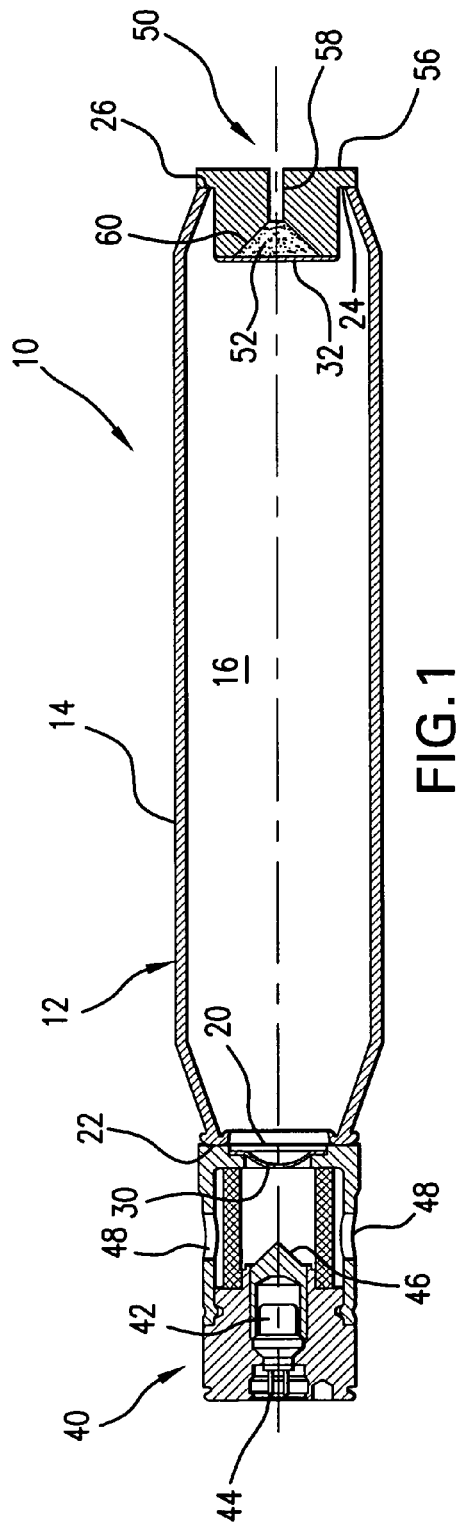
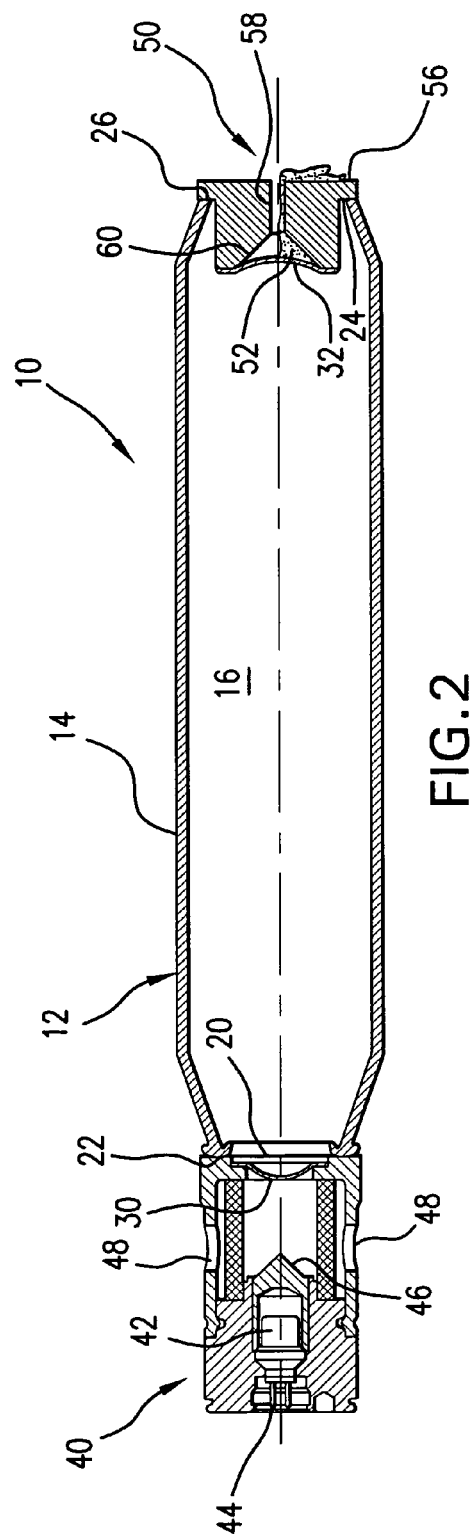

INFLATOR DEVICE PRESSURE RELIEF

BACKGROUND OF THE INVENTION

This invention relates generally to inflator devices such as used in vehicle safety restraint systems and, more particularly, to the provision of pressure relief of gases in such devices under specific circumstances such during bonfire conditions.

It is well known to protect a vehicle occupant by means of safety restraint systems which self-actuate from an undeployed or static state to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushion(s) may desirably deploy into one or more locations within the vehicle between the occupant and certain parts of the vehicle interior, such as the doors, steering wheel, dashboard or the like, to prevent or avoid the occupant from forcibly striking such parts of the vehicle interior.

Inflatable safety restraint installations typically use an inflator device to produce inflation gas for inflating the inflatable airbag in the event of a collision. Many types of inflator devices have been disclosed in the art for inflating an inflatable restraint system airbag cushion. One category of such inflator devices is often referred to as "compressed gas inflators" and generally refers to various inflator devices which contain compressed gas.

As is known, one particular type of compressed gas inflator, commonly referred to as a "stored gas inflator," simply contains a quantity of a stored compressed gas which is selectively released to inflate an associated airbag cushion.

Another known type of compressed gas inflator is commonly referred to as a "hybrid" inflator. In such an inflator device, inflation gas results from a combination of stored compressed gas and the combustion of a gas generating material, e.g., a pyrotechnic.

One disadvantage of compressed gas inflators is that failure of the inflator pressure vessel can occur during exposure to unanticipated high temperature conditions. In addition to steel, and in order to satisfy light weight specifications, aluminum or an aluminum alloy could be used for the inflator housing. Such materials will not experience problems during normal use, such as during deployment in the event of a collision. However, if the inflator is exposed to a high temperature environment, such as a bonfire, for example, encountered during storage or shipping or in the event of a vehicle fire, the inflator housing structure can degrade tending to rupture or burst. Alternatively, the inflator device can unintentionally discharge causing an uninstalled or unsecured inflator device to be propelled.

Thus, there is a need for an inflator device which provides pressure relief of gases generated during a bonfire, to prevent the inflator from propelling or degrading and rupturing.

SUMMARY OF THE INVENTION

A general object of the invention is to provide an improved pressure relief mechanism for inflator devices.

A more specific objective of the invention is to overcome one or more of the problems described above.

The general object of the invention can be attained, at least in part, through an inflator device. The inflator device includes a housing including a housing wall at least in part defining a chamber containing a stored gas. The housing wall includes an outlet orifice. A rupturable seal seals the outlet orifice, and a plug at least partially disposed at the outlet orifice includes a low melting temperature material adjacent the rupturable seal.

As compared to the plug mechanism of this invention, the prior art generally fails to provide an efficient and effective venting apparatus for venting stored gas in inflator devices during bonfire conditions.

The invention further comprehends an inflator device for an inflatable cushion restraint system. The inflator device includes a housing at least in part defining a chamber containing a stored gas. The housing includes a first outlet orifice and a second outlet orifice. A first rupturable seal is disposed over the first outlet orifice and a second rupturable seal is disposed over the second outlet orifice. The second rupturable seal is adapted to rupture upon a lower pressure within the chamber than the first rupturable seal. A plug is at least partially disposed at the second outlet orifice and includes a low melting temperature material adjacent the second rupturable seal. The low melting temperature material melts at or below an auto-ignition temperature of the inflator device.

The invention still further comprehends a method for providing pressure relief to an inflator device for an inflatable cushion restraint system, where the inflator device includes a housing including a housing wall at least in part defining a chamber containing a stored gas. The method includes sealing an outlet orifice in the housing wall with a rupturable seal and supporting the rupturable seal with a plug at least partially disposed in the outlet orifice. The plug comprises a low melting temperature material, wherein the low melting temperature material melts at or below an auto-ignition temperature of the inflator device.

Other objects and advantages will be apparent to those skilled in the art from the following detailed description taken in conjunction with the appended claims and drawings.

BRIEF DESCRIPTION OF THE DRAWINGS

FIG. 1 is a sectional view of an inflator device according to one embodiment of this invention.

FIG. 2 is the inflator device of FIG. 1 upon an elevated temperature, such as a bonfire condition.

DETAILED DESCRIPTION OF THE INVENTION

FIG. 1 is an inflator device 10 for an inflatable cushion restraint system according to one embodiment of this invention. The inflator device 10 includes a housing 12 with a housing wall 14 at least in part defining a chamber 16. The chamber 16 contains a stored gas, such as a compressed inert gas.

The housing 12 includes a first outlet orifice 20 at a housing first end 22 and a second outlet orifice 24 at a housing second end 26 opposite the first end 22. A first rupturable seal 30, e.g., a metal burst disk, is disposed over and seals the first outlet orifice 20 to maintain the gas within the chamber 16. A second rupturable seal 32, e.g., a metal burst disk, is disposed over and seals the second outlet orifice 24 to maintain the gas within the chamber 16.

In the embodiment of the invention shown in FIG. 1, an initiator assembly 40 is connected to the housing 12 at the housing first end 22. The initiator assembly includes an initiator device 42 that contains electrical conductive pins 44 in reaction initiating combination with a reactive charge contained within the initiator device 42. Upon receiving an appropriate electrical signal in the event of an occurrence of a collision, the reactive charge of the initiator device 42 reacts and propels a piston 46 at the first rupturable seal 30. The piston 46 ruptures the first rupturable seal 30, thereby releasing the compressed gas out through radial gas discharge openings 48 as inflation gas for inflating an associated inflatable cushion (not shown).

In one embodiment of this invention, the second outlet orifice 24 can desirably provide pressure relief if the inflator device 10 is subjected to elevated temperatures, such as discussed above, that can cause the second rupturable seal 32 to rupture due to increasing pressure within the chamber 16. A plug 50 is at least partially disposed in the second outlet orifice 24. The plug comprises a mass 52 of a low melting temperature material that is disposed adjacent to the second rupturable seal 32, and desirably on a side of the second rupturable seal 32 opposite the stored gas in chamber 16. The low melting temperature material mass 52 desirably supports the second rupturable seal 32 during normal storage, transport, assembly, and deployment conditions. In accordance with one preferred embodiment, the low melting temperature material mass 52 is desirably disposed directly adjacent the second rupturable seal 32.

When, however, the inflator device 10 is subjected to higher temperatures than anticipated during normal use, such as during a bonfire, the low melting temperature material mass 52 melts, as shown in FIG. 2, and no longer provides supports for the second rupturable seal 32. Without the support provided by the low melting temperature material mass 52, the second rupturable seal 32 desirably ruptures to allow controlled venting of the gas to the ambient environment. The low temperature material mass can include various and alternative materials that are capable of remaining in a solid state during normal inflator device deployment conditions, but that melt upon an elevated temperature during bonfire conditions. In one embodiment of this invention, the low melting temperature material melts at or below an auto-ignition temperature of the inflator device. In another embodiment of this invention, where the inflator device is a hybrid inflator device that includes a supply of gas generant material for reacting to produce additional inflation gas, as is commonly known to those skilled in the art, the low melting temperature material melts at a temperature at or below an auto-ignition temperature of the gas generant material. Desirably, in one embodiment of the invention, the low melting temperature material melts at a temperature of about 120° C. to 250° C. Examples of materials useful for forming the low melting temperature of the invention include bismuth, tin, lead, cadmium, indium, silver, and combinations thereof. Other materials, such as thermoplastic materials, can also be used as the low melting temperature of the invention.

In the embodiment of FIGS. 1 and 2, the plug 50 additionally comprises a support member 56 at least partially disposed in the second outlet orifice 24. The support member 56 includes a member outlet orifice 58 extending through the support member 56 and between the chamber 16 and the ambient environment. The second rupturable seal 32 is disposed over the end of the member outlet orifice 58 disposed in or toward the chamber 16. The low melting temperature material mass 52 is disposed within the member outlet orifice 58 and adjacent the second rupturable seal 32. As shown in FIGS. 1 and 2, a portion of the member outlet orifice 58 has a tapered side wall 60. As shown in FIG. 2, upon removing the support of the low melting temperature material mass 52, the tapered side wall 60 provides a larger orifice area adjacent the second rupturable seal 32. As will be appreciated, having such a larger orifice area behind the second rupturable seal 32 can desirably foster rupture of the second rupturable seal 32. The tapered side wall 60 also desirably provides support for the low melting temperature material mass 52, as shown in FIG. 1.

As shown in FIG. 2, upon an elevated temperature, such as during a bonfire, the low melting temperature material mass 52 softens or melts allowing the second rupturable seal 32 to rupture. In one embodiment of the invention, the second rupturable seal 32 is adapted to rupture upon a lower pressure within the chamber than the first rupturable seal 30, thereby promoting venting. The member outlet orifice 58 of one embodiment of this invention is desirably sized to limit a force of gas expelled therethrough to below a threshold force for propelling the inflator device. While not providing an exactly thrust neutral condition, the controlled venting of the gas according to this invention desirably does not allow the inflator device to be propelled, as may occur in many types of unsecured inflator devices if the gas is expelled through the intended or primary outlet orifice, such as first outlet orifice 20.

If the low melting temperature material mass 52 melts at a temperature below the auto-ignition temperature and the second rupturable seal 32 ruptures, desirably little or no gas would be present in the inflator when auto-ignition occurs. If the material melts at or near the auto-ignition temperature, the softened material can be sufficiently deteriorated in strength, such that increased pressure within the chamber 16, such resulting from the rising temperature therewithin, can desirably lead to rupture of the second rupturable seal 32 and expulsion of at least a portion of the material mass 52, creating an additional outlet for the pressurized gas exiting from the inflator device. The additional exit path desirably prevents the inflator device from experiencing extremely high internal pressures and reduces or eliminates failure or propulsion of the inflator device due to such an over-pressurization. The plug mechanism of the present invention also provides pressure relief for inflators which utilize higher strength primary burst disks. If a bonfire does not occur, the inflator device is still able to function normally.

The invention further provides a method for providing pressure relief to an inflator device for an inflatable cushion restraint system. An outlet orifice in the inflator housing wall is sealed with a rupturable seal, such as described above. The rupturable seal is supported with a plug at least partially disposed in the outlet orifice. The plug includes a low melting temperature material. The low melting temperature material melts at or below an auto-ignition temperature of the inflator device to allow the stored gas to vent from the inflator device. As will be appreciated by those skilled in the art following the teachings herein provided, the plug of the invention may be useful in other aspects beyond venting stored gas upon a bonfire. The plug including a low melting temperature material of the invention can be incorporated in any discharge opening of an inflator device, such as a primary gas discharge orifice, for allowing gas to discharge from the inflator device upon an elevated temperature, such as to an inflatable cushion.

While the invention has been described above making specific reference to an embodiment utilizing a plug that in addition to the mass of a low melting temperature material additionally comprises a support member at least partially disposed in the housing outlet orifice, those skilled in the art and guided by the teachings herein provided will appreciate that the broader practice of the invention is not necessarily so limited. For example, in an alternative embodiment, the invention can be practiced without the inclusion of such a support member such as through the simple placement of the low melting temperature material adjacent desired the rupturable seal.

Thus, the invention provides a venting apparatus for stored pressurized gas inflator devices. The plug according to the invention provides pressure relief of gases generated during bonfire, thereby preventing the inflator from degrading, rupturing or being propelled. By sizing the venting orifice appropriately, the venting gas can occur with a force that is not sufficient to propel the inflator device, thereby providing relatively safe venting during a bonfire.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An inflator device for an inflatable cushion restraint system, the inflator device comprising:
    a housing including a housing wall at least in part defining a chamber, the chamber containing a stored gas;
    an outlet orifice in the housing wall;
    a rupturable seal sealing the outlet orifice; and
    a plug at least partially disposed at the outlet orifice and comprising a low melting temperature material adjacent the rupturable seal.

2. The inflator device of claim 1 wherein the low melting temperature material melts at or below an auto-ignition temperature of the inflator device.

3. The inflator device of claim 1 wherein the low melting temperature material is disposed adjacent the rupturable seal on a side opposite the stored gas.

4. The inflator device of claim 1 wherein upon melting of the low melting temperature material, a pressure of the stored gas within the chamber ruptures the rupturable seal to vent at least a portion of the stored gas.

5. The inflator device of claim 1 wherein the low melting temperature material melts at a temperature of about 120° C. to 250° C.

6. The inflator device of claim 1 wherein the low melting temperature material comprises a material selected from a group consisting of bismuth, tin, lead, cadmium, indium, silver, and combinations thereof.

7. The inflator device of claim 1 additionally comprising a supply of a gas generant material, and the low melting temperature material melts at a temperature at or below an auto-ignition temperature of the gas generant material.

8. The inflator device of claim 1 wherein the outlet orifice comprises a size that limits a force of gas expelled therethrough to below a threshold force for propelling the inflator device.

9. The inflator device according to claim 1 wherein the plug comprises a support member at least partially disposed in the outlet orifice, the support member comprising a member outlet orifice, wherein the low melting temperature material is at least partially disposed within the member outlet orifice.

10. The inflator device of claim 9 wherein the rupturable seal is disposed over the member outlet orifice.

11. The inflator device of claim 9 wherein at least a portion of the member outlet orifice comprises a tapered side wall.

12. An inflator device for an inflatable cushion restraint system, the inflator device comprising:
    a housing at least in part defining a chamber, the chamber containing a stored gas;
    the housing including a first outlet orifice and a second outlet orifice;
    a first rupturable seal disposed over the first outlet orifice and a second rupturable seal disposed over the second outlet orifice, wherein the second rupturable seal is adapted to rupture upon a lower pressure within the chamber than the first rupturable seal;
    a plug at least partially disposed at the second outlet orifice and comprising a low melting temperature material adjacent the second rupturable seal, wherein the low melting temperature material melts at or below an auto-ignition temperature of the inflator device.

13. The inflator device of claim 12 wherein the second outlet orifice is disposed on an opposite side of the housing from the first outlet orifice.

14. The inflator device of claim 12 wherein at least one of the first and second rupturable seals comprises a burst disk.

15. The inflator device of claim 12 wherein upon melting of the low melting temperature material, a pressure of the stored gas within the chamber ruptures the second rupturable seal to vent at least a portion of the stored gas.

16. The inflator device of claim 12 wherein the second outlet orifice comprises a size that limits a force of gas expelled therethrough to below a threshold force for propelling the inflator device.

17. The inflator device of claim 12 wherein the low melting temperature material is disposed adjacent the second rupturable seal on a side opposite the stored gas.

18. The inflator device according to claim 12 wherein the plug additionally comprises a support member at least partially disposed in the second outlet orifice, the support member comprises a member outlet orifice including a tapered side wall, the low melting temperature material is at least partially disposed within the member outlet orifice, and the second rupturable seal is disposed over the member outlet orifice.

19. A method for providing pressure relief to an inflator device for an inflatable cushion restraint system, the inflator device including a housing including a housing wall at least in part defining a chamber containing a stored gas, the method comprising:
    sealing an outlet orifice in the housing wall with a rupturable seal; and
    supporting the rupturable seal with a plug at least partially disposed in the outlet orifice and comprising a low melting temperature material, wherein the low melting temperature material melts at or below an auto-ignition temperature of the inflator device.

20. The method of claim 19 additionally comprising melting the plug and rupturing the rupturable seal.

* * * * *